(12) United States Patent
Takeda et al.

(10) Patent No.: US 9,942,862 B2
(45) Date of Patent: Apr. 10, 2018

(54) USER TERMINAL, RADIO BASE STATION AND RADIO COMMUNICATION METHOD

(71) Applicant: NTT DOCOMO, INC., Tokyo (JP)

(72) Inventors: Kazuki Takeda, Tokyo (JP); Shimpei Yasukawa, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 155 days.

(21) Appl. No.: 14/889,384

(22) PCT Filed: Apr. 8, 2014

(86) PCT No.: PCT/JP2014/060182
§ 371 (c)(1),
(2) Date: Nov. 5, 2015

(87) PCT Pub. No.: WO2014/181626
PCT Pub. Date: Nov. 13, 2014

(65) Prior Publication Data
US 2016/0105857 A1 Apr. 14, 2016

(30) Foreign Application Priority Data

May 9, 2013 (JP) ................................. 2013-099629

(51) Int. Cl.
*H04W 52/54* (2009.01)
*H04W 52/24* (2009.01)
(Continued)

(52) U.S. Cl.
CPC ......... *H04W 52/54* (2013.01); *H04W 52/243* (2013.01); *H04W 52/244* (2013.01); *H04W 72/082* (2013.01); *H04W 72/10* (2013.01); *H04W 52/146* (2013.01); *H04W 52/325* (2013.01)

(58) Field of Classification Search
CPC . H04W 52/54; H04W 52/243; H04W 52/244; H04W 72/082
See application file for complete search history.

(56) References Cited

U.S. PATENT DOCUMENTS

2011/0275403 A1* 11/2011 Chen .................. H04W 52/146
                                                                455/522
2013/0114562 A1    5/2013 Seo et al.

FOREIGN PATENT DOCUMENTS

WO        2012008773 A2     1/2012

OTHER PUBLICATIONS

International Search Report issued in PCT/JP2014/060182 dated Jun. 10, 2014 (1 page).

(Continued)

*Primary Examiner* — Siming Liu
(74) *Attorney, Agent, or Firm* — Osha Liang LLP

(57) ABSTRACT

The present invention is designed to control inter-cell interference adequately even when a plurality of cells are placed at a high density. A user terminal can connect with a plurality of radio base stations, and has a receiving section that receives a downlink signal from each radio base station, and a power control section that, when an uplink grant or a downlink assignment and a control signal for power control are detected at the same time from the downlink signal, prioritizes a TPC command contained in the control signal for power control, and changes transmission power.

9 Claims, 11 Drawing Sheets

(51) Int. Cl.
    *H04W 72/08*     (2009.01)
    *H04W 72/10*     (2009.01)
    *H04W 52/14*     (2009.01)
    *H04W 52/32*     (2009.01)

(56) References Cited

OTHER PUBLICATIONS

3GPP TR 36.814 V9.0.0; "3rd Generation Partnership Project; Technical Specification Group Radio Access Network; Evolved Universal Terrestrial Radio Access (E-UTRA); Further advancements for E-UTRA physical layer aspects (Release 9)"; Mar. 2010 (107 pages).

ZTE; "Issues on UL TPC transmission in LTE-Advanced"; 3GPP TSG RAN WG1 Meeting #62, R1-104674; Madrid, Spain; Aug. 23-27, 2010 (3 pages).

European Search Report issued in corresponding European Application No. 14794686.7, dated Nov. 8, 2016 (8 pages).

\* cited by examiner

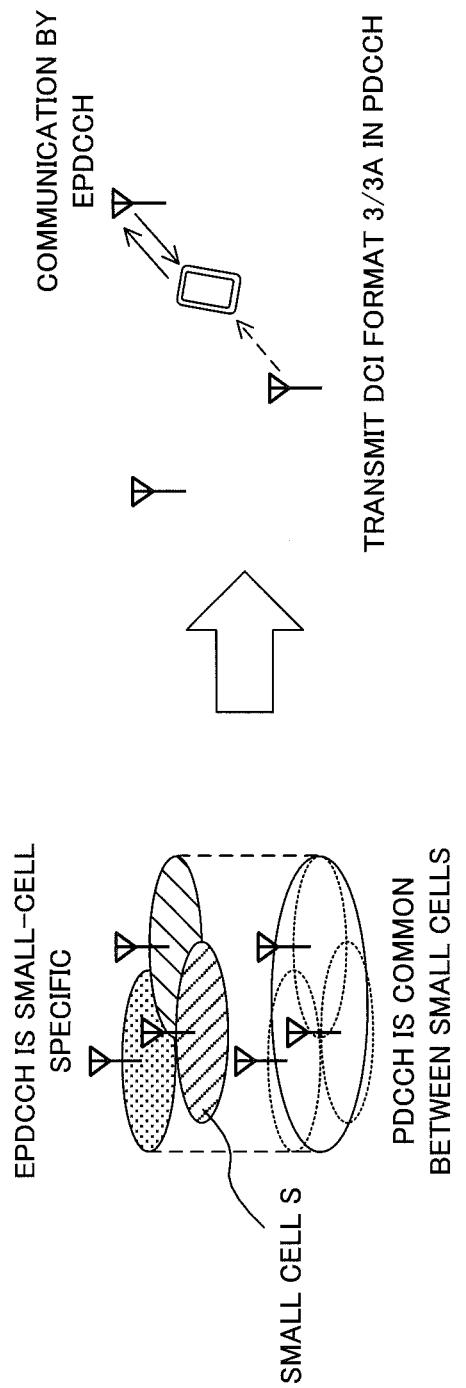

USER TERMINAL, RADIO BASE STATION AND RADIO COMMUNICATION METHOD

TECHNICAL FIELD

The present invention relates to a user terminal, a radio base station and a radio communication method in a next-generation mobile communication system.

BACKGROUND ART

In LTE (Long Term Evolution) and successor systems of LTE (referred to as, for example, "LTE-advanced," "FRA (Future Radio Access)" and "4G"), a radio communication system (referred to as, for example, a "HetNet" (Heterogeneous Network)), in which small cells (including pico cells, femto cells and so on) having relatively small coverages of a radius of approximately several meters to several tens of meters are placed in a macro cell having a relatively large coverage of a radius of approximately several hundred meters to several kilometers, is under study (see, for example, non-patent literature 1).

For this radio communication system, a scenario to use the same frequency band in both the macro cell and the small cells (also referred to as, for example, "co-channel") and a scenario to use different frequency bands between the macro cell and the small cells (also referred to as, for example, "separate frequencies") are under study. To be more specific, the latter scenario is under study to use a relatively low frequency band (for example, 2 GHz) in the macro cell and use a relatively high frequency band (for example, 3.5 GHz or 10 GHz) in the small cells.

CITATION LIST

Non-Patent Literature

Non-Patent Literature 1: 3GPP TR 36.814 "E-UTRA Further Advancements for E-UTRA Physical Layer Aspects"

SUMMARY OF INVENTION

Technical Problem

In the above HetNet, many small cells may be placed in the macro cell. In this case, for example, in places where many user terminals gather and where the traffic increases locally such as train stations, shopping malls and so on, it may be possible to distribute the traffic over many cells (traffic offloading) by raising the density of placing small cells (dense small cells).

However, in places where small cells are placed at a high density, there is a threat that interference is produced between the small cells. For example, where there is a radio base station (for example, a small base station) forming a given cell, there is a threat that an uplink signal transmitted from a user terminal of a nearby cell may interfere with this radio base station.

The present invention has been made in view of the above, and it is therefore an object of the present invention to provide a user terminal, a radio base station and a radio communication method that can adequately control inter-cell interference even when a plurality of cells are placed at a high density.

Solution to Problem

A user terminal, according to the present invention, is a user terminal that is configured to be able to connect with a plurality of radio base stations, and has a receiving section that receives a downlink signal from each of the radio base stations, and a power control section that, when an uplink grant or a downlink assignment and a control signal for power control are detected at the same time from the downlink signal, prioritizes a TPC command contained in the control signal for power control to change transmission power.

Advantageous Effects of Invention

According to the present invention, it is possible to adequately control inter-cell interference on the uplink even when a plurality of cells are placed at a high density.

BRIEF DESCRIPTION OF DRAWINGS

FIG. 4 provides diagrams to show example cases where the transmission power control method according to the present embodiment is employed.

DESCRIPTION OF EMBODIMENTS

Figure 1:
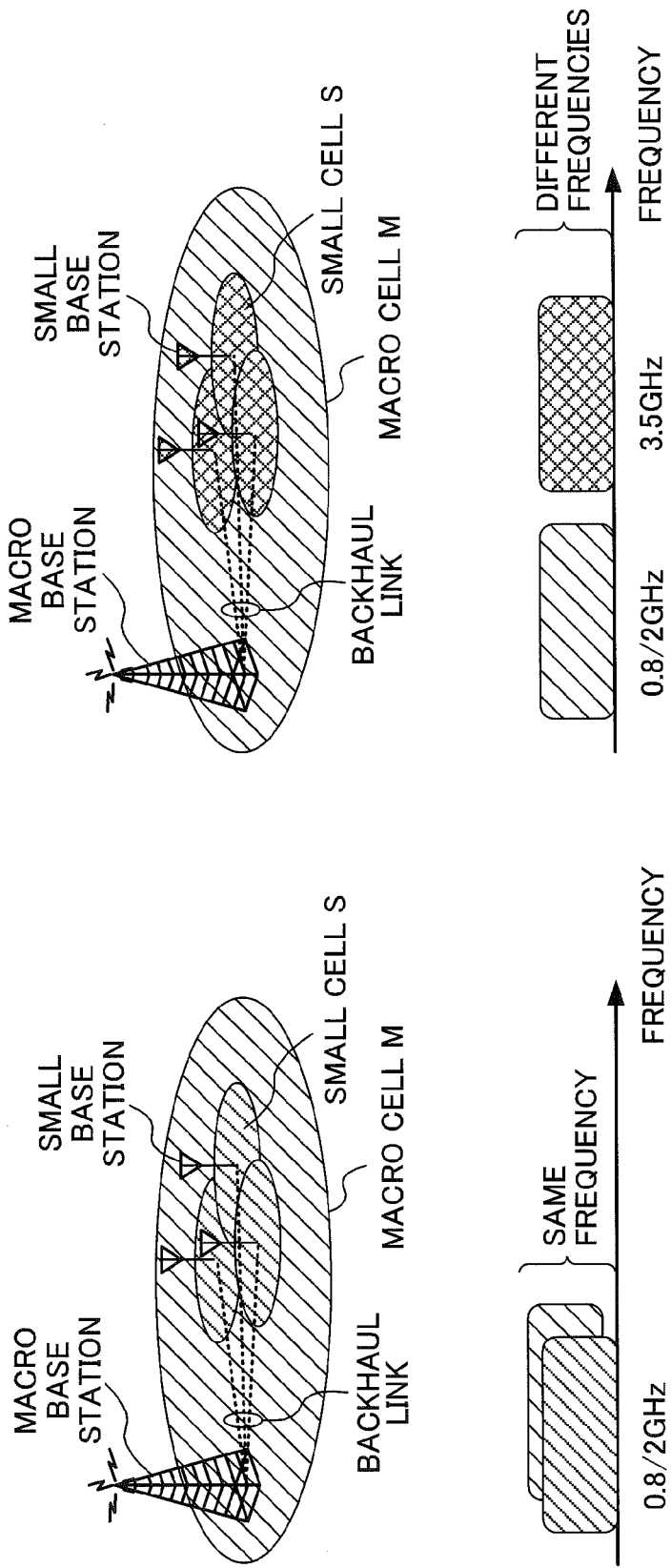
FIG. 1 provides conceptual diagrams of a HetNet.

FIG. 1 provides conceptual diagrams of a HetNet. FIG. 1A shows a case where the same frequency band is used between a macro cell and small cells. FIG. 1B shows a case where different frequency bands are used between a macro cell and small cells.

As shown in FIG. 1, a HetNet refers to a radio communication system in which a macro cell M and small cells S are arranged to overlap each other geographically at least in part. Also, a HetNet is comprised of a radio base station that forms a macro cell M (hereinafter referred to as a "macro base station"), radio base stations that form small cells S (hereinafter referred to as "small base stations"), and a user terminal that communicates with the macro base station and the small base stations.

In the case illustrated in FIG. 1A, in the macro cell M and the small cells S, it is possible to use, for example, a carrier of the same frequency band such as 0.8 GHz (800 MHz) and 2 GHz. In the case illustrated in FIG. 1B, in the macro cell M, for example, a carrier F1 of a relatively low frequency band such as 0.8 GHz (800 MHz) and 2 GHz is used. Meanwhile, in a plurality of small cells S, for example, a carrier F2 of a relatively high frequency band such as 3.5 GHz is used.

Also, when the small cells S and the macro cell M are operated under different radio base stations, the macro base station and the small base stations are connected via backhaul and exchange information mutually. The connection between the macro base station and the small base stations may assume wire connection by means of optical fiber, non-optical fiber (X2 interface) and so on, or may assume wireless connection. Note that, when the macro base station and the small base stations are connected via channels other than optical fiber (for example, via the X2 interface), the delay time in the transmission/reception of information between the macro base station and the small base stations is not negligible. Although, ideally, the transmission delay of backhaul is zero millisecond, there is nevertheless a possibility that the transmission delay becomes maximum several tens of milliseconds, depending on the environment of backhaul.

In the radio communication system shown in FIG. 1, since the macro cell M secures coverage, it is possible to guarantee communication at a certain level, and, based upon this, provide small cells S. Consequently, it is possible to reduce the cost pertaining to providing, operating and maintaining small cells S.

Meanwhile, when cells to use the same frequency band are placed at a high density, and, furthermore, the individual coverages overlap each other in a complex manner, the problem is likely that the impact of inter-cell interference becomes greater than the effect of traffic offloading. Also, in an environment in which a macro cell M and small cells S operate in the same frequency band, the problem is likely that significant interference is produced between the macro cell M and the small cells S. In particular, on the uplink where the location of transmission, the transmission power and so on vary on a per user terminal basis, there is a problem that inter-cell interference has a significant impact on throughput performance.

Consequently, for inter-cell interference control on the uplink, a method of reducing the transmission power of user terminals that cause significant interference may be possible.

Figure 2:
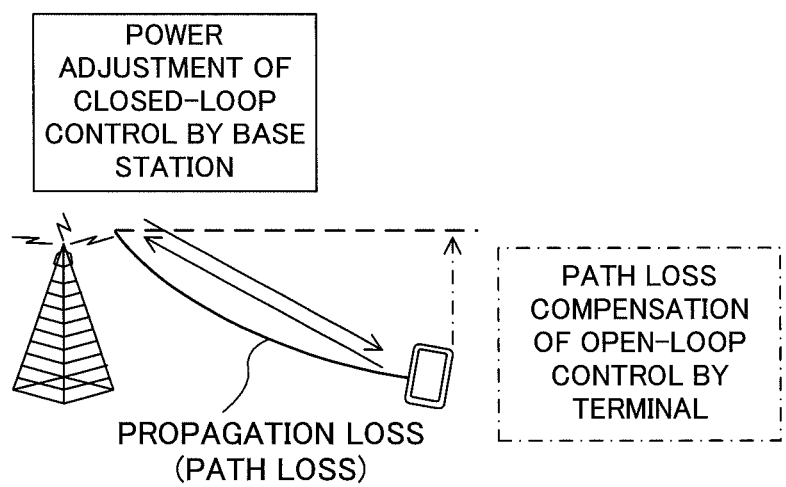
FIG. 2 is a diagram to explain uplink data signal transmission power control in a user terminal.

As shown in FIG. 2, the transmission power of an uplink data signal from a user terminal is controlled by the combination of path loss compensation of open-loop control by the user terminal and power adjustment of closed-loop control by the radio base station.

To be more specific, the transmission power of signals to transmit on the uplink such as the PUSCH (Physical Uplink Shared Channel), the PUCCH (Physical Uplink Control Channel) and the SRS (Sounding Reference Signal) is controlled by the combination of open-loop control, in which a user terminal compensates for the propagation loss that is calculated from the received power of downlink reference signals, and closed-loop control, in which a radio base station measure the received quality from the user terminal and commands the user terminal to increase and decrease the transmission power by using TPC (Transmission Power Control) commands.

To be more specific, the transmission power of an uplink data signal in a user terminal is represented by following equation 1:

(Equation 1)

$$P_{PUSCH,c}(i) = \min \left\{ \begin{array}{l} P_{CMAX,c(i)}, \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{array} \right\} [dBm] \quad [1]$$

Here, $P_{CMAX,c}(i)$ is the maximum permissible transmission power, $M_{PUSCH,c}(i)$ is the assigned bandwidth, $P_{O\_PUSCH,c}(j)$ is the transmission power offset (target received power), α is a fractional TPC weighting coefficient, $PL_c$ is the path loss measurement value, $\Delta_{TF,c}(i)$ is a MCS-dependent offset, and $f_c(i)$ is a correction value by a TPC command.

Generally, $f_c(i)$, which is a closed-loop TPC parameter, is controlled by a TPC command that is transmitted in the PDCCH (Physical Downlink Control Channel), which is a physical downlink control channel, or the enhanced PDCCH (Enhanced Physical Downlink Control Channel: EPDCCH).

Figure 3:
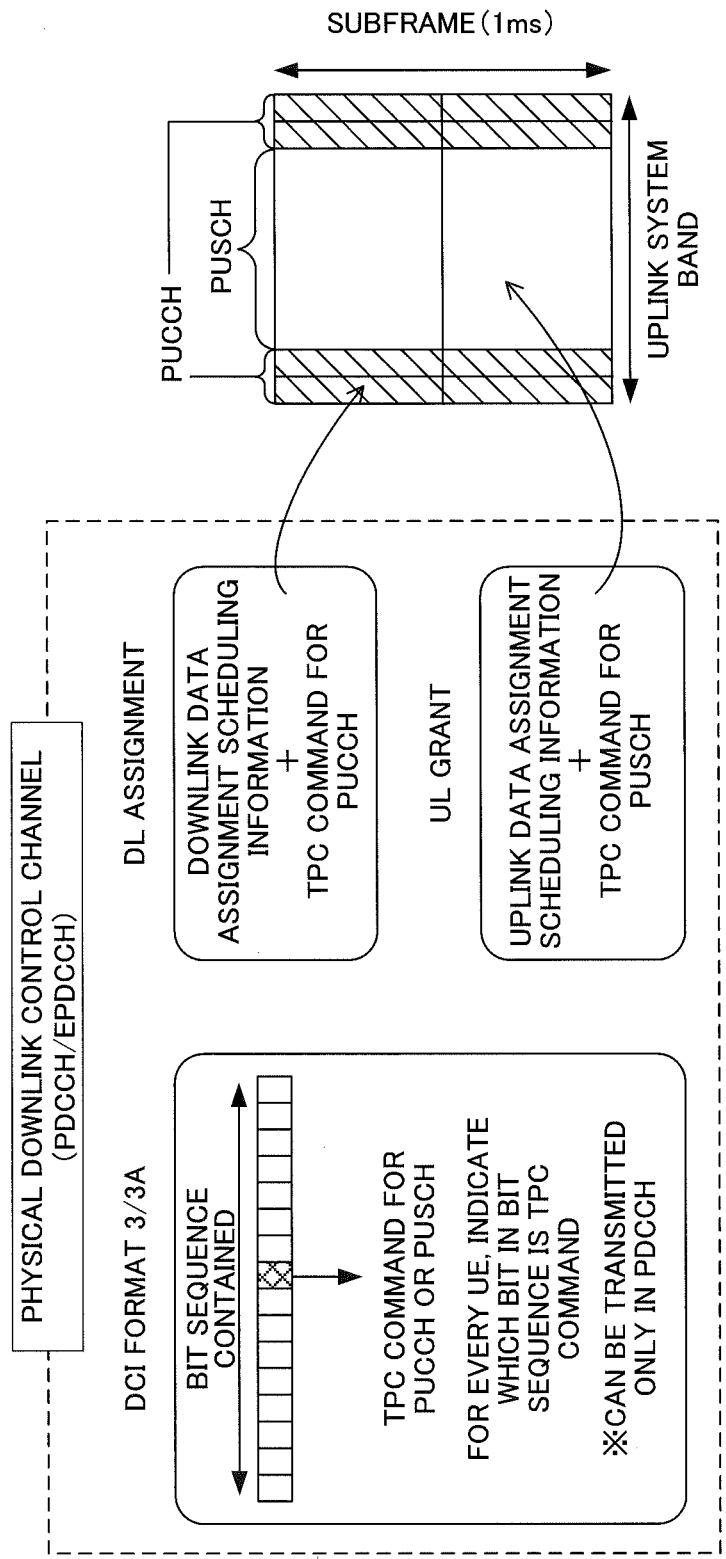
FIG. 3 is a diagram to explain TPC commands to execute closed-loop control.

As shown in FIG. 3, a TPC command to control the PUSCH, which is an uplink shared channel, is transmitted in an uplink grant (UL grant) that commands the scheduling of the PUSCH, or in a DCI format 3/3A, which is formed only with TPC commands for a plurality of user terminals.

The uplink grant includes uplink data assignment scheduling information and the TPC command for the PUSCH. Note that an uplink grant can be transmitted either via the PDCCH or via the enhanced PDCCH.

Meanwhile, the DCI format 3/3A is a format that is applied to downlink control signals for transmission power control, and includes a plurality of TPC commands for a plurality of user terminals. For example, the radio base station reports an identity and one index to the user terminal, and the user terminal identifies the TPC command corresponding to the index included in the DCI format 3/3A, identified by the identity reported from the radio base station, as a TPC command for the subject apparatus. Note that the DCI format 3/3A can be transmitted only via the PDCCH.

Also, a TPC command to control the PUCCH, which is an uplink control channel, is sent in a downlink assignment (DL assignment) that reports PDSCH scheduling information, or in the DCI format 3/3A.

The downlink assignment includes downlink data assignment scheduling information, and the TPC command for the PUCCH. Note that the downlink assignment can be transmitted either via the PDCCH or via the enhanced PDCCH.

Now, when TPC commands for each user terminal are transmitted by using the uplink grant or the downlink assignment, it is not possible to transmit TPC commands to user terminals that do not communicate with radio base stations. That is to say, controlling TPC commands by way of the uplink grant or the downlink assignment is possible only in cells where communication with user terminals takes place.

Meanwhile, the DCI format 3/3A is a control signal that can be transmitted independently of the uplink grant or the downlink assignment. Consequently, seen from the radio base station side, by using the DCI format 3/3A, it is possible to transmit TPC commands to any user terminals and execute closed-loop control, regardless of whether or not communication is in progress on the uplink/downlink. In other words, the DCI format 3/3A makes it possible to transmit TPC commands even from cells apart from cells that communicate with user terminals.

However, when a user terminal detects an uplink grant or a downlink assignment, the user terminal executes transmission power control by using the TPC command contained in the uplink grant or the downlink assignment. In other words, even if the user terminal detects an uplink grant or a downlink assignment and a DCI format 3/3A in the same subframe, the user terminal disregards the TPC command contained in the DCI format 3/3A. Consequently, uplink grants and downlink assignments are transmitted continuously to user terminals that communicate a large amount of data, so that TPC commands via the DCI format 3/3A are less likely to be employed. That is to say, it is not possible to execute closed-loop control by the DCI format 3/3A for such user terminals. Consequently, even if TPC commands are transmitted in the DCI format 3/3A from cells apart from cells that communicate with user terminal as noted above, the possibility is high that power control still cannot be executed.

So, the present inventors have found out executing transmission power control independently of uplink grants or downlink assignments, which are for assigning communication, by switching the TPC command to use in transmission power control from what is conventionally used—that is, by changing the order of priority of TPC commands for use in transmission power control—when a user terminal detects an uplink grant or a downlink assignment and a DCI format 3/3A at the same time. By this means, where there is a user terminal that causes significant interference, even a nearby cell that does not communicate directly with the user terminal can transmit TPC commands by means of the DCI format 3/3A and execute transmission power control.

First Example

Now, transmission power control, which, when a user terminal detects an uplink grant or a downlink assignment and a DCI format 3/3A at the same time, is executed by changing the order of priority of TPC commands and using the TPC command contained in the DCI format 3/3A, will be described below in detail.

The operation of a radio base station in the event this transmission power control is executed will be described.

The radio base station judges whether or not a user terminal can change the order of priority of TPC commands. For example, the radio base station judges whether or not a user terminal can change the order of priority of TPC commands based on user terminal capability information (UE capability), which is reported from the user terminal to the radio base station.

When the radio base station indicates a change of the order of priority of TPC commands based on each user terminal's capability, the radio base station informs, as power control command information, which one of the TPC command contained in the uplink grant or the downlink assignment and the TPC command contained in the DCI format 3/3A is to be prioritized, by a higher layer such as RRC (Radio Resource Control).

Also, to a user terminal, the radio base station informs an identity (Radio Network Temporary Identity: RNTI) for decoding the DCI format 3/3A, and a TPC index that specifies which field in the DCI format 3/3A is the TPC command for the user terminal, via RRC.

In a physical cell or a virtual cell that communicates with a user terminal, an uplink grant or a downlink assignment is transmitted to the user terminal. On the other hand, in a physical cell or a virtual cell that does not communicate with a user terminal, transmission power control for the user terminal is indicated by way of the DCI format 3/3A, when the user terminal is judged to cause significant interference.

Next, the operation of a user terminal in the event transmission power control is executed will be described.

The user terminal configures a change in the order of priority of TPC commands when one of the following conditions (1) to (5) is satisfied.

(1) When a command is sent from a radio base station through a higher layer such as RRC. Note that the command may be included in the MAC header. Also, it is equally possible to change the order of priority of TPC commands during a predetermined time period following the command from the radio base station. The predetermined time period may be, for example, a period of several subframes (which are provided in millisecond units), a period of several radio frames (which are provided in ten-millisecond units), and so on. In this case, after a predetermined time passes, the order of priority of TPC commands resumes the earlier order of priority, so that it is possible to prevent the increase of signaling overhead required to return to the original order of priority of TPC commands.

(2) When a physical downlink control channel to be transmitted by a plurality of different physical cells or virtual cells is configured.

(3) When inter-eNB CoMP/CA is configured, or higher layer signaling for executing inter-eNB CoMP/CA is received, from a radio base station.

(4) When a change in the ratio of downlink subframes and uplink subframes (UL-DL configuration) is commanded in a time division duplexing (Time Division Duplex: TDD) scheme, or until a predetermined time passes after the ratio change command.

(5) The subframe of the subframe number where the uplink and the downlink switch, when the ratio between downlink subframes and uplink subframes is changed in a time division duplexing (TDD) scheme.

In the case illustrated in above (5), a specific example is shown in following table 1:

| | [1] | | | | | | | | | |
|---|---|---|---|---|---|---|---|---|---|---|
| UL-DL | Subframe number | | | | | | | | | |
| config | 0 | 1 | 2 | 3 | 4 | 5 | 6 | 7 | 8 | 9 |
| 3 | D | S | U | U | U | D | D | D | D | D |
| 4 | D | S | U | U | D | D | D | D | D | D |

Table 1 is a table to show uplink/downlink configurations in the TDD scheme. Subframes in the TDD scheme may be downlink subframes (D), uplink subframes (U) and special subframes (S).

As shown in table 1, when the ratio between downlink subframes and uplink subframes is changed based on the uplink/downlink configuration values (UL-DL config) 3 and 4, the uplink subframe (U) and the downlink subframe (D) switch in subframe number 4. Consequently, a user terminal has only to change the order of priority of TPC commands in the subframe of subframe number 4.

(1) to (5) given above all illustrate an environment in which interference between cells has a significant impact, and it is possible to control interference effectively by changing the order of priority of TPC commands and making it possible to execute power control by means of the DCI format 3/3A.

The user terminal monitors search spaces in control channels where control signals may be transmitted, and executes blind decoding.

When the user terminal, having configured a change in the order of priority of TPC commands by blind decoding, detects a DCI format 3/3A, the user terminal changes the transmission power based on the TPC command contained in the DCI format 3/3A, regardless of whether or not an uplink grant or a downlink assignment is detected. On the other hand, when the user terminal, having configured a change in the order of priority of TPC commands, detects an uplink grant or a downlink assignment without detecting a DCI format 3/3A, the user terminal changes the transmission power based on the TPC command contained in the uplink grant or the downlink assignment.

By assuming the above operations in radio base station and user terminals, where there are a user terminals that cause significant interference, even nearby cells that do not communicate directly with the user terminals can control the transmission power of the user terminals and reduce interference, by transmitting TPC commands by means of the DCI format 3/3A.

Also, when the transmission power control according to the first example is executed, it is not necessary to introduce new mechanism or control signals. A user terminal has only to receive and detect control signal in the same way as heretofore, and change the TPC command to use in transmission power control among the TPC commands contained in the control signals obtained. Consequently, it is possible to re-use the existing LTE-advanced terminal circuitry, and prevent the increase of cost.

Application Example 1

An application example of the above transmission power control in the event small cells S that are crowded closely form one virtual cell as shown in FIG. 4 will be described.

As shown in FIG. 4A, when small cells S that are crowded closely form one virtual cell, part of the physical downlink control channels (for example, the PDCCH) is configured to be operated on a shared basis between the small cells, and part of the physical downlink control channels (for example, the enhanced PDCCH) is configured to be operated separately between the small cells.

Then, user terminals in each small cell S are configured to monitor both the PDCCH and the enhanced PDCCH. By this means, as shown in FIG. 4B, each small cell S can communicate with the user terminals in the subject cell via the enhanced PDCCH, and meanwhile control the transmission power of user terminals in nearby small cells by means of the DCI format 3/3A that is transmitted in the PDCCH.

Application Example 2

Figure 5B:
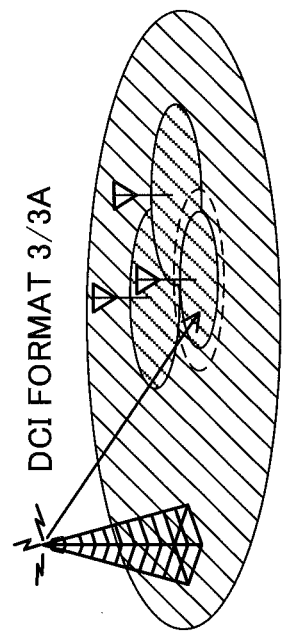
FIG. 5 provides diagrams to show example cases where the transmission power control method according to the present embodiment is employed.

An application example of the above transmission power control in the event a macro cell M and small cells S assume an overlay cellular structure as shown in FIG. 5 will be described.

Figure 5A:
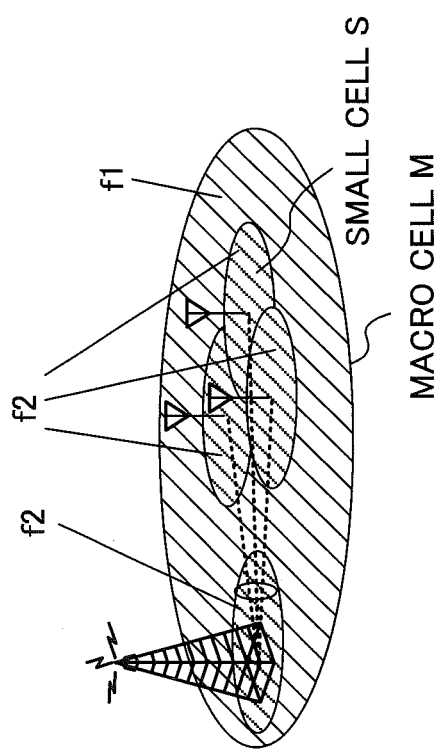

As shown in FIG. 5A, the macro cell M forms a cell with two different frequency bands (f1 and f2), and the small cells S form cells with the frequency band f2. In this case, user terminals in each small cell S monitor physical downlink control channels in both the frequency band f2 by the small cells S and the frequency band f1 by the macro cell M.

User terminals in each small cell S carry out downlink and uplink communication primarily in the frequency band f2 by the small cells S. However, if the macro cell M judges that the user terminals cause significant interference, it is possible to transmit a DCI format 3/3A in the frequency band f1 and execute transmission power control (see FIG. 5B).

At this time, if the macro cell M can specify an individual user terminal causing significant interference in the small cell S, it is possible to execute transmission power control using the TPC command for this user terminal contained in the DCI format 3/3A. Also, even if the macro cell M cannot specify an individual user terminal causing significant interference in the small cell S, it is still possible to indicate user terminals, which are indicated in advance to receive the DCI format 3/3A, to lower the transmission power all together. In this case, in a spurious way, it is possible to make the uplink coverage of the small cell S smaller.

(Variation 1)

A method will be described with variation 1 in which the DCI format 3/3A is transmitted in individual search spaces (UE-specific search spaces: UE-SSs).

According to the first example, the DCI format 3/3A can be transmitted only in the PDCCH. On the other hand, the uplink grant and the downlink assignment can be transmitted not only in the PDCCH, but can also be transmitted in the enhanced PDCCH as well.

This is because of the difference between the search spaces configured in the PDCCH and the enhanced PDCCH. As search spaces for trying to blind-decode and detect control signals, a search space that is common between cells (common-SS: C-SS) and individual search spaces (UE-SSs) are configured in the PDCCH, and individual search spaces (UE-SSs) alone are configured in the enhanced PDCCH. Then, there is a limitation that only the cell-common search space (C-SS) can transmit the DCI format 3/3A.

So, the present inventors have found out transmitting the DCI format 3/3A in individual search spaces (UE-SSs). In this case, in which search space the DCI format 3/3A is likely to be transmitted, among a plurality of search spaces that a user terminal blind-decodes, is indicated to the user terminal in advance. This information may be transmitted with higher layer information such as RRC that is transmitted before the DCI format 3/3A is transmitted.

By transmitting the DCI format 3/3A in individual search spaces (UE-SSs), it is possible to transmit the DCI format 3/3A in the enhanced PDCCH, which can be configured on a per user terminal basis, so that it is possible to operate virtual cells more flexibly.

Also, it becomes possible to transmit the DCI format 3/3A in component carriers (CCs) where the PDCCH is not transmitted.

Furthermore, since it is possible to execute interference control between cells with respect to the enhanced PDCCH, it becomes possible to detect the DCI formats 3/3A transmitted from nearby cells with high accuracy.

Furthermore, although the amount of resources is limited with the cell-common search space (C-SS), the amount of resources is abundant with the individual search spaces (UE-SS), so that it becomes possible to transmit DCI formats 3/3A to more user terminals.

(Variation 2)

With variation 2, the process in the event a user terminal detects a plurality of DCI formats 3/3A at the same time will be described.

Figures 6A, 6B:
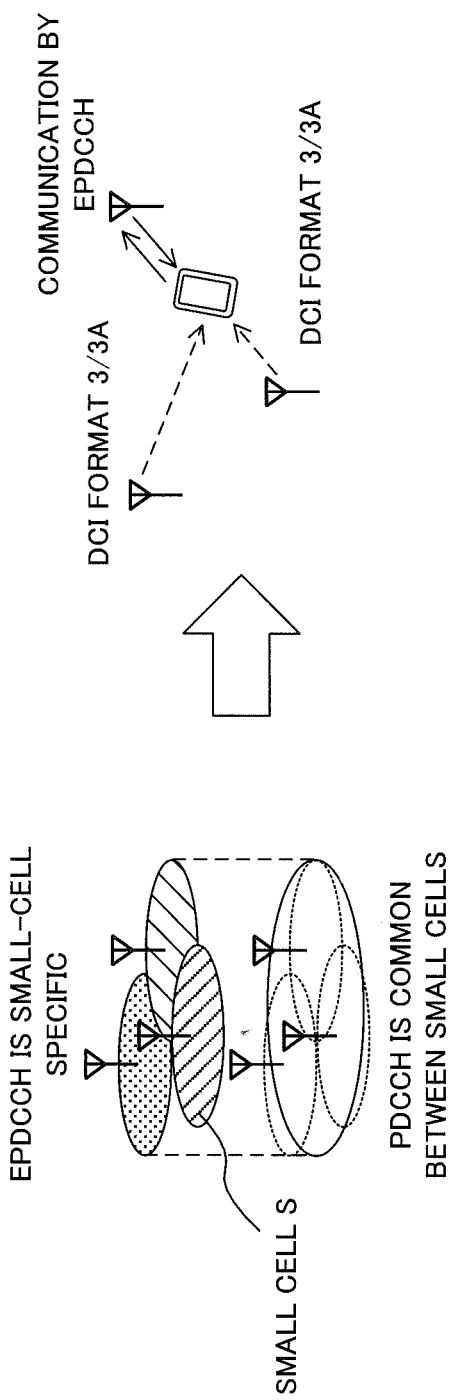
FIG. 6 provides diagrams to show example cases where the transmission power control method according to the present embodiment is employed.

According to the first example, there is a possibility that a user terminal detects a plurality of DCI formats 3/3A at the same time. For example, as shown in FIG. 6A, in the case illustrated in application example 1 of the first example, when a plurality of nearby small cells S judge that a user terminal is causing significant interference, it may occur that each small cell S transmits a DCI format 3/3A, and the user terminal detects a plurality of DCI formats 3/3A at the same time, as shown in FIG. 6B.

At this time, the user terminal is unable to judge which of a plurality of TPC commands that are received the user terminals has to follow. Consequently, it is necessary to determine the order of priority among a plurality of DCI formats 3/3A that are detected.

So, when a user terminal detects a plurality of DCI formats 3/3A, the user terminal may select the TPC command to use in closed-loop control based on one rule among following (1) to (3):

(1) select the TPC command to indicate the smallest value among those detected;

(2) select the TPC command contained in the DCI format 3/3A that is encoded at the lowest aggregation level (AL) among those detected; and (3) combine above (1) and (2) and select the TPC command.

In the event of above (1), it becomes possible to improve the effect of reducing interference by following the TPC command which the cell that is interfered with the most commands.

In the event of above (2), the aggregation level is equivalent to the coding rate of the DCI format 3/3A, and lower aggregation levels correspond to higher coding rates. Consequently, the lower the aggregation level, the higher the possibility that the DCI format 3/3A is transmitted from a nearby cell that is close to the user terminal. That is to say, by following the TPC command contained in the DCI format 3/3A of the lowest aggregation level, the possibility increases that the interference in the cell that is interfered with the most can be reduced.

(Variation 3)

A method will be described with variation 3 in which the order of priority of TPC commands is changed in accordance with TPC commands.

According to first example, when an uplink grant or a downlink assignment and a DCI format 3/3A are detected at the same time, the TPC command contained in the DCI format 3/3A is prioritized, and transmission power control is executed by using the TPC command contained in the DCI format 3/3A, so that closed-loop control by the DCI format 3/3A is made possible. Although, according to this method, interference from user terminals can be reduced, TPC command-based control cannot be executed in the cells where these user terminals belong, and therefore there is a possibility that the quality of these user terminals deteriorates.

Meanwhile, in nearby cells, preventing a sudden increase of interference by user terminals is of the highest importance.

So, even when an uplink grant or a downlink assignment and a DCI format 3/3A are detected at the same time, only when the value of the TPC command contained in the uplink grant or the downlink assignment is three, it may be possible to prioritize the TPC command contained in the DCI format 3/3A and control transmission power. The TPC commands are shown in following table 2:

TABLE 2

| TPC command value | Conventional power control | Present method |
|---|---|---|
| 0 | −1 dB | −1 dB |
| 1 | +0 dB | +0 dB |
| 2 | +1 dB | +1 dB |
| 3 | +3 dB | (1) +3 dB, (2) follow DCI format 3/3A if available |

Table 2 is a table to show the relationship among TPC command values, conventional power control and the power control of the present method. As shown in Table 2, when the value of the TPC command contained in the uplink grant or the downlink assignment is 0, 1 and 2, the TPC command contained in the uplink grant or the downlink assignment is prioritized, and the same power control as conventional power control is executed. Power control is executed by prioritizing the TPC command contained in the DCI format 3/3A only when the value of the TPC command contained in the uplink grant or the downlink assignment is 3.

According to this method, smooth power adjustment based on TPC commands by the subject cell and prevention of a sudden increase of interference by nearby cells are both made possible.

(Structure of Radio Communication System)

Now, an example of a radio communication system according to the present embodiment will be described in detail below.

Figure 7:
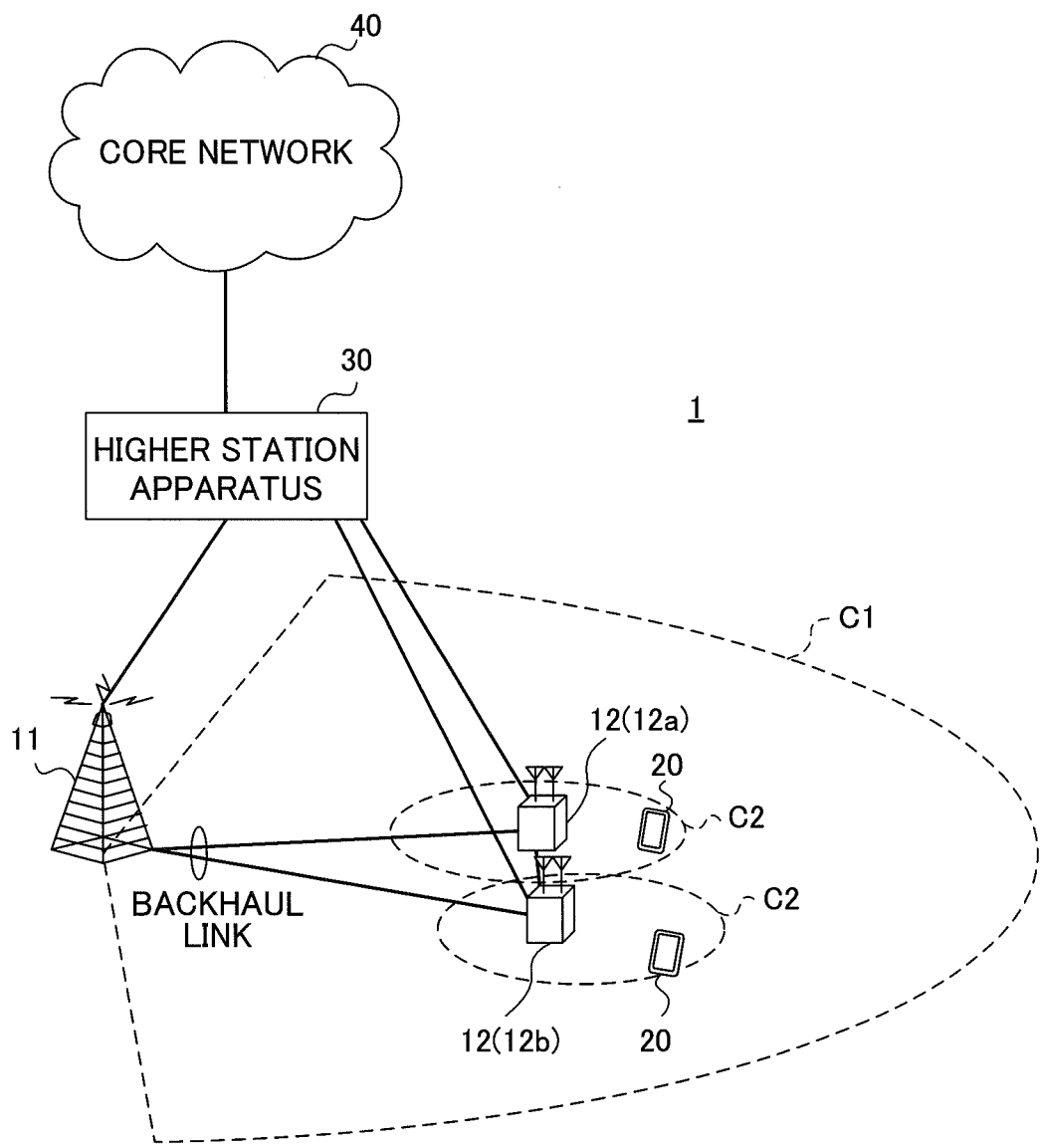
FIG. 7 is a schematic diagram to show example of a radio communication system according to the present embodiment.

FIG. 7 is a schematic configuration diagram of a radio communication system according to the present embodiment. Note that the radio communication system shown in FIG. 7 is a system to accommodate, for example, the LTE system or SUPER 3G. This radio communication system can adopt carrier aggregation (CA) to group a plurality of fundamental frequency blocks (component carriers) into one, where the system bandwidth of the LTE system constitutes one unit. Also, this radio communication system may be referred to as "IMT-advanced," or may be referred to as "4G" or "FRA (Future Radio Access)."

The radio communication system 1 shown in FIG. 7 includes a radio base station 11 that forms a macro cell C1, and radio base stations 12 (12a and 12b) that form small cells C2, which are placed in the macro cell C1, and which are narrower than the macro cell C1. Also, in the macro cell C1 and in each small cell C2, user terminals 20 are placed. The user terminals 20 can connect with both the radio base station 11 and the radio base stations 12 (dual connectivity).

Between the user terminals 20 and the radio base station 11, communication is carried out using a carrier of a relatively low frequency band (for example, 2 GHz) and a narrow bandwidth (referred to as "existing carrier," "legacy carrier" and so on). Meanwhile, between the user terminals 20 and the radio base stations 12, a carrier of a relatively high frequency band (for example, 3.5 GHz, etc.) and a wide bandwidth may be used, or the same carrier as that used in the radio base station 11 may be used. For the carrier type between the user terminals 20 and the radio base stations 12, a new carrier type (NCT) may be used. The connection between the radio base station 11 and the radio base stations 12 (or between the radio base stations 12) is implemented by wire connection (optical fiber, the X2 interface and so on) or by wireless connection.

The radio base station 11 and the radio base stations 12 are each connected with a higher station apparatus 30, and connected with a core network 40 via the higher station apparatus 30. Note that the higher station apparatus 30 may be, for example, an access gateway apparatus, a radio network controller (RNC), a mobility management entity (MME) and so on, but is by no means limited to these. Also, the radio base station 12 may be each connected with the higher station apparatus via the radio base station 11.

Note that the radio base station 11 is a radio base station having a relatively wide coverage, and may be referred to as an "eNodeB," a "macro base station," a "transmitting/receiving point" and so on. Also, the radio base stations 12 are radio base stations having local coverages, and may be referred to as "small base stations," "pico base stations," "femto base stations," "Home eNodeBs," "micro base stations," "transmitting/receiving points" and so on. Also, when no distinction is made between the radio base stations 11 and 12, these will be collectively referred to as the "radio base station 10." The user terminals 20 are terminals to support various communication schemes such as LTE, LTE-A and so on, and may include both mobile communication terminals and fixed communication terminals.

In the radio communication system, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single-carrier transmission scheme to reduce interference between terminals by dividing the system band into bands formed with one or continuous resource blocks, per terminal, and allowing a plurality of terminals to use mutually different bands.

Now, communication channels to be used in the radio communication system shown in FIG. 7 will be described. Downlink communication channels include a PDSCH, which is used by each user terminal 20 on a shared basis, and downlink L1/L2 control channels (a PDCCH, a PCFICH, a PHICH and an enhanced PDCCH).

User data and higher control information are transmitted by the PDSCH. Scheduling information for the PDSCH and the PUSCH and so on are transmitted by the PDCCH. The number of OFDM symbols to use for the PDCCH is transmitted by the PCFICH (Physical Control Format Indicator CHannel). HARQ ACKs/NACKs in response to the PUSCH are transmitted by the PHICH (Physical Hybrid-ARQ Indicator CHannel). Also, the scheduling information for the PDSCH and the PUSCH and so on may be transmitted by the enhanced PDCCH (EPDCCH) as well. This enhanced PDCCH is frequency-division-multiplexed with the PDSCH (downlink shared data channel).

Also, the TPC command for the PUSCH contained in the uplink grant, the TPC command for the PUCCH contained in the downlink assignment and the DCI format 3/3A are transmitted by the PDCCH or the enhanced PDCCH.

Uplink communication channels include the PUSCH, which is used by each user terminal 20 on a shared basis as an uplink data channel, and the PUCCH, which is an uplink control channel. User data and higher control information are transmitted by this PUSCH. Also, downlink radio quality information (CQI: Channel Quality Indicator), ACKs/NACKs and so on are transmitted by the PUCCH.

Figure 8:
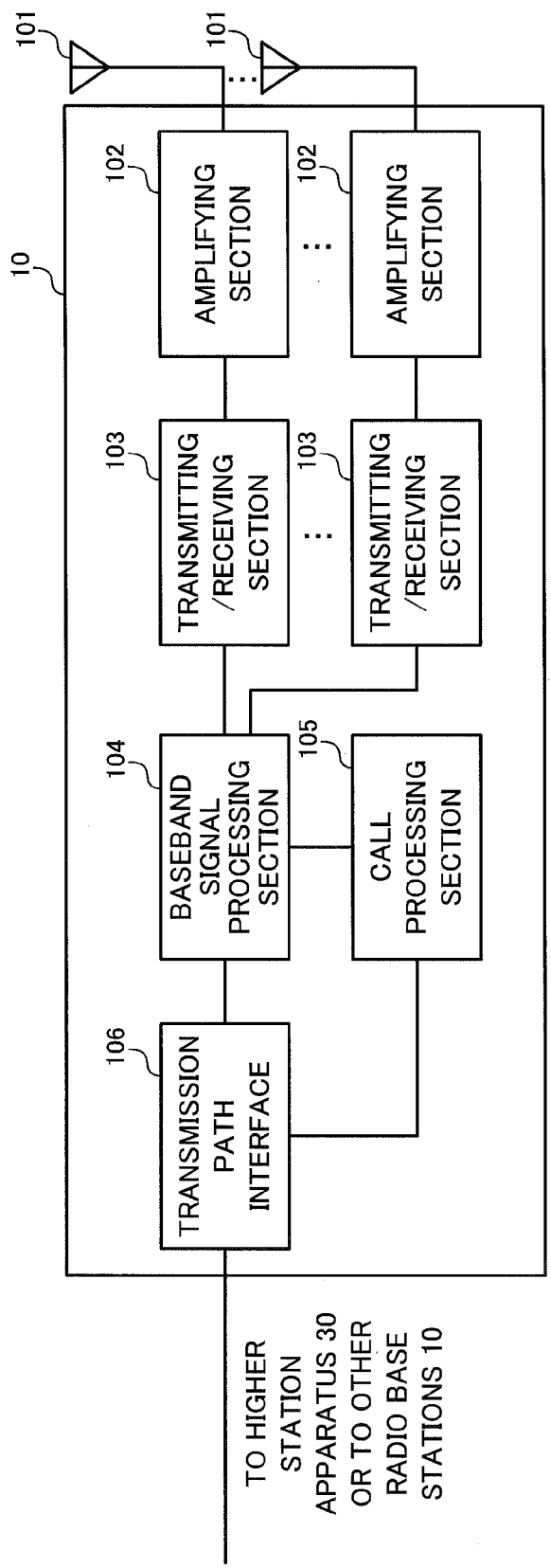
FIG. 8 is a diagram to explain an overall structure of a radio base station according to the present embodiment.

FIG. 8 is a diagram to show an overall structure of a radio base station 10 (which covers the radio base stations 11 and 12) according to the present embodiment. The radio base station 10 has a plurality of transmitting/receiving antennas 101 for MIMO transmission, amplifying sections 102, transmitting/receiving sections 103, a baseband signal processing section 104, a call processing section 105 and a transmission path interface 106.

User data to be transmitted from the radio base station 10 to a user terminal 20 on the downlink is input from the higher station apparatus 30, into the baseband signal processing section 104, via the transmission path interface 106.

In the baseband signal processing section 104, a PDCP layer process, division and coupling of the user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process and a pre-coding process are performed, and the result is transferred to each transmitting/receiving section 103. Furthermore, downlink control channel signals are also subjected to transmission processes such as channel coding and an inverse fast Fourier transform, and are transferred to each transmitting/receiving section 103.

Also, the baseband signal processing section 104 reports, to the user terminal 20, control information for allowing communication in the cell, through higher layer signaling (RRC signaling, broadcast channel and so on). The information for allowing communication in the cell includes, for example, the uplink or downlink system bandwidth, feedback resource information, and so on. Each transmitting/receiving section 103 converts the baseband signals, which are pre-coded and output from the baseband signal processing section 104 on a per antenna basis, into a radio frequency band. The amplifying sections 102 amplify the radio frequency signals having been subjected to frequency conversion, and transmit the results through the transmitting/receiving antennas 101.

On the other hand, as for data that is transmitted from the user terminal 20 to the radio base station 10 on the uplink, radio frequency signals that are received in the transmitting/receiving antennas 101 are each amplified in the amplifying sections 102, converted into baseband signals through frequency conversion in each transmitting/receiving section 103, and input into the baseband signal processing section 104.

In the baseband signal processing section 104, the user data that is included in the input baseband signals is subjected to an FFT process, an IDFT process, error correction decoding, a MAC retransmission control receiving process and RLC layer and PDCP layer receiving processes, and the result is transferred to the higher station apparatus 30 via the transmission path interface 106. The call processing section 105 performs call processing such as setting up and releasing communication channels, manages the state of the radio base station 10 and manages the radio resources.

Figure 9:
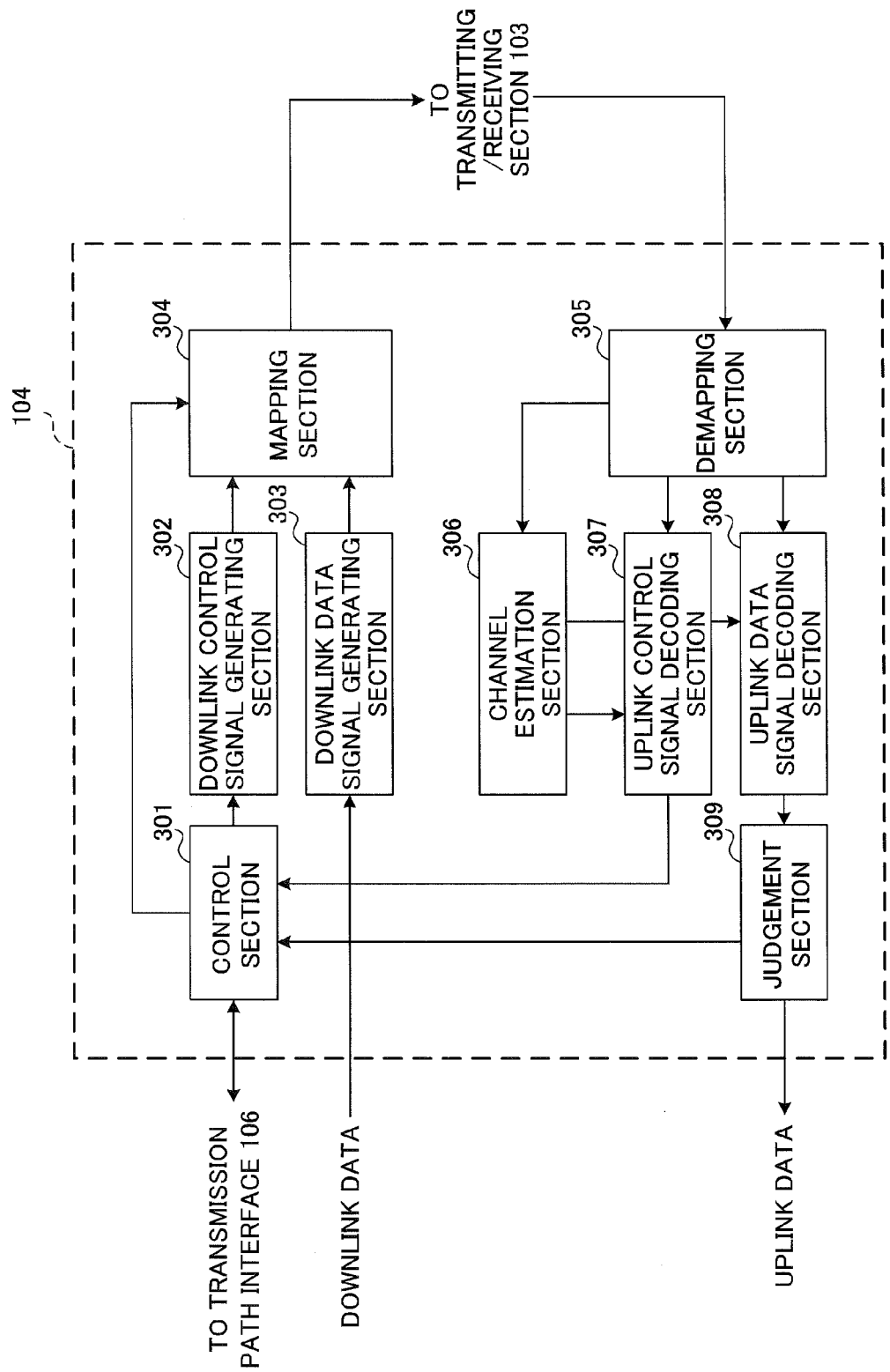
FIG. 9 is a diagram to explain a functional structure of a radio base station according to the present embodiment.

FIG. 9 is a diagram to show a principle functional structure of a baseband signal processing section 104 provided in a radio base station 10 according to the present embodiment. As shown in FIG. 9, the baseband signal processing section 104 provided in the radio base station 10 is comprised at least of a control section 301, a downlink control signal generating section 302, a downlink data signal generating section 303, a mapping section 304, a demapping section 305, a channel estimation section 306, an uplink control signal decoding section 307, an uplink data signal decoding section 308 and a judgement section 309.

The control section 301 controls the downlink user data transmitted in the PDSCH, and the downlink assignment, the uplink grant and the DCI formats 3/3A transmitted in both or either one of the PDCCH and the enhanced PDCCH (EPDCCH).

To be more specific, the control section 301 controls the assignment of radio resources to downlink signals and uplink signals based on command information from the higher station apparatus 30, feedback information from each user terminal 20, and so on. That is, the control section 301 functions as a scheduler.

Also, the control section 301 controls the generation and reporting of TPC commands for executing transmission power control for each user terminal 20. To be more specific, the control section 301 assigns an RNTI for decoding the DCI format 3/3A and an index that indicates the position where the TPC command is multiplexed in the DCI format 3/3A, to each user terminal 20.

When the radio base station 10 commands a user terminal 20 to change the order of priority of TPC commands, the control section 301 judge whether or not the user terminal 20 can change the order of priority of TPC commands, based on capability information of the user terminal 20, which is reported from the user terminal 20 to the radio base station 10. Then, if the user terminal 20 can change the order of priority of TPC commands, the control section 301 controls as to which one of the TPC command contained in the uplink grant or the downlink assignment and the TPC command contained in the DCI format 3/3A the user terminal 20 should prioritize.

The downlink control signal generating section 302 generates downlink control signals (both or either one of the PDCCH signal and the enhanced PDCCH signal), the assignment of which is determined by the control section 301. To be more specific, based on commands from the control section 301, the downlink control signal generating section 302 generates a downlink assignment, which reports downlink signal assignment information and a TPC command to control the PUCCH, an uplink grant, which reports uplink signal assignment information and a TPC command to control the PUSCH, and a DCI format 3/3A.

The downlink data signal generating section 303 generates downlink data signals (PDSCH signal), the assignment of which to resources is determined by the control section 301. The data signals that are generated in the data signal generating section 303 are subjected to a coding process and a modulation process, based on coding rates and modulation schemes that are determined based on CSI from each user terminal 20 and so on. The TPC command-related information that is determined in the control section 301 may be included as higher layer signaling in the downlink data signals generated in the downlink data signal generating section 303.

The mapping section 304 controls the assignment of the downlink control signals generated in the downlink control signal generating section 302 and the downlink data signals generated in the downlink data signal generating section 303 to radio resources, based on commands from the control section 301.

The demapping section 305 demaps the uplink signals transmitted from the user terminals and separates the uplink signals. The channel estimation section 306 estimates channel states from the reference signals included in the received signals separated in the demapping section 305, and outputs the estimated channel states to the uplink control signal decoding section 307 and the uplink data signal decoding section 308.

The uplink control signal decoding section 307 decodes the feedback signal (delivery acknowledgement signal and so on) transmitted in the uplink control channel (PUCCH), and outputs the result to the control section 301. The uplink data signal decoding section 308 decodes the uplink data signal transmitted in the uplink shared channel (PUSCH), and outputs the result to the judgement section 309. The judgement section 309 makes a retransmission control judgement (ACK/NACK) based on the decoding result in the uplink data signal decoding section 308, and outputs result to the control section 301.

Figure 10:
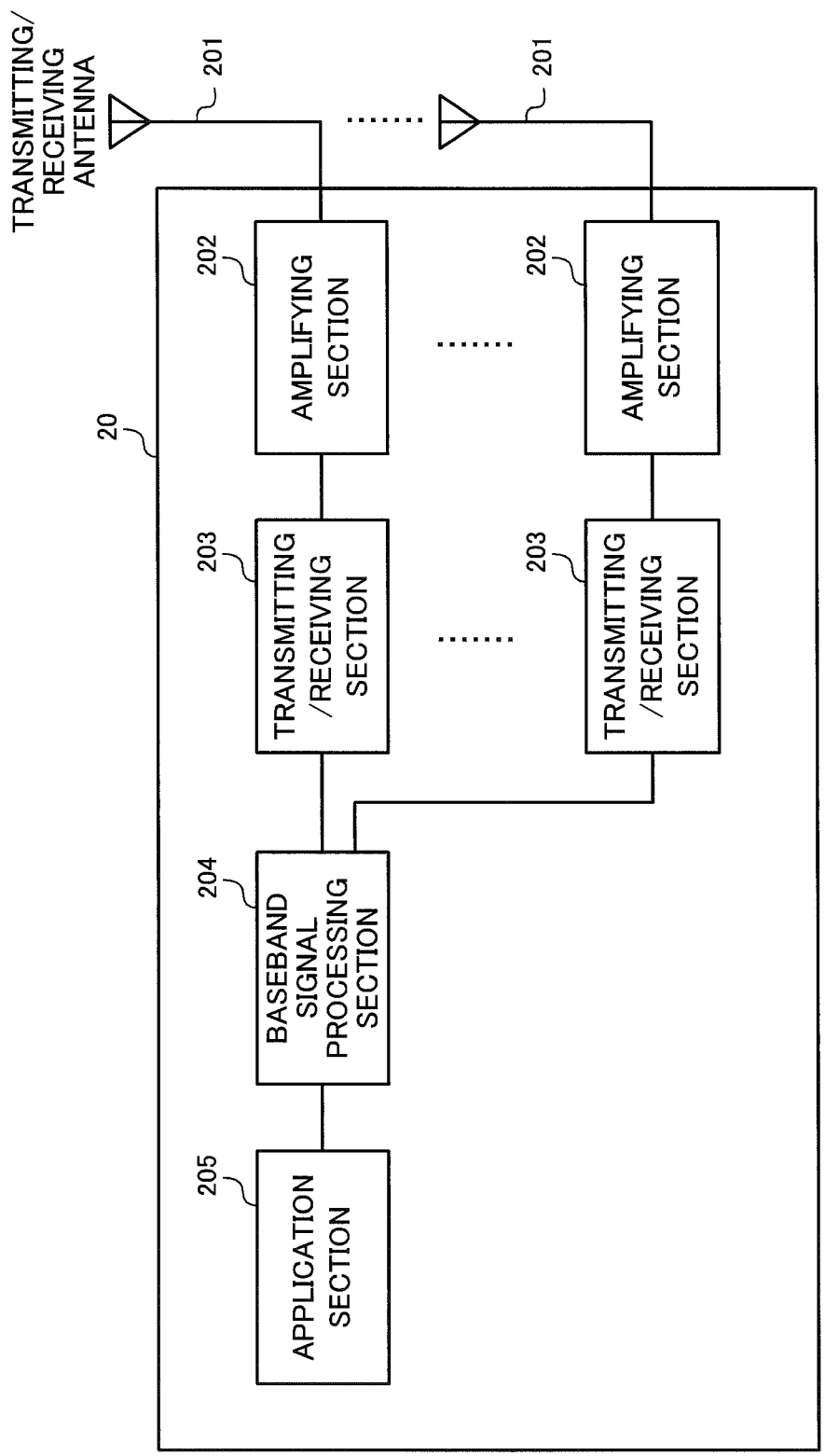
FIG. 10 is a diagram to explain an overall structure of a user terminal according to the present embodiment.

FIG. 10 is a diagram to show an overall structure of a user terminal 20 according to the present embodiment. The user terminal 20 has a plurality of transmitting/receiving antennas 201 for MIMO transmission, amplifying sections 202, transmitting/receiving sections (receiving sections) 203, a baseband signal processing section 204 and an application section 205.

As for downlink data, radio frequency signals that are received in a plurality of transmitting/receiving antennas 201 are each amplified in the amplifying sections 202, and subjected to frequency conversion and converted into baseband signals in the transmitting/receiving section 203. These baseband signals are subjected to an FFT process, error correction decoding, a retransmission control receiving process and so on, in the baseband signal processing section 204. In this downlink data, downlink user data is transferred to the application section 205. The application section 205 performs processes related to higher layers above the physical layer and the MAC layer, and so on. Also, in the downlink data, broadcast information is also transferred to the application section 205.

Meanwhile, uplink user data is input from the application section 205 into the baseband signal processing section 204. The baseband signal processing section 204 performs a retransmission control (HARQ (Hybrid ARQ)) transmission process, channel coding, pre-coding, a DFT process, an IFFT process and so on, and transfers the result to each transmitting/receiving sections 203. The baseband signals that are output from the baseband signal processing section 204 are converted into a radio frequency band in the transmitting/receiving sections 203. After that, the amplifying sections 202 amplify the radio frequency signals having been subjected to frequency conversion, and transmit the results from the transmitting/receiving antennas 201.

Figure 11:
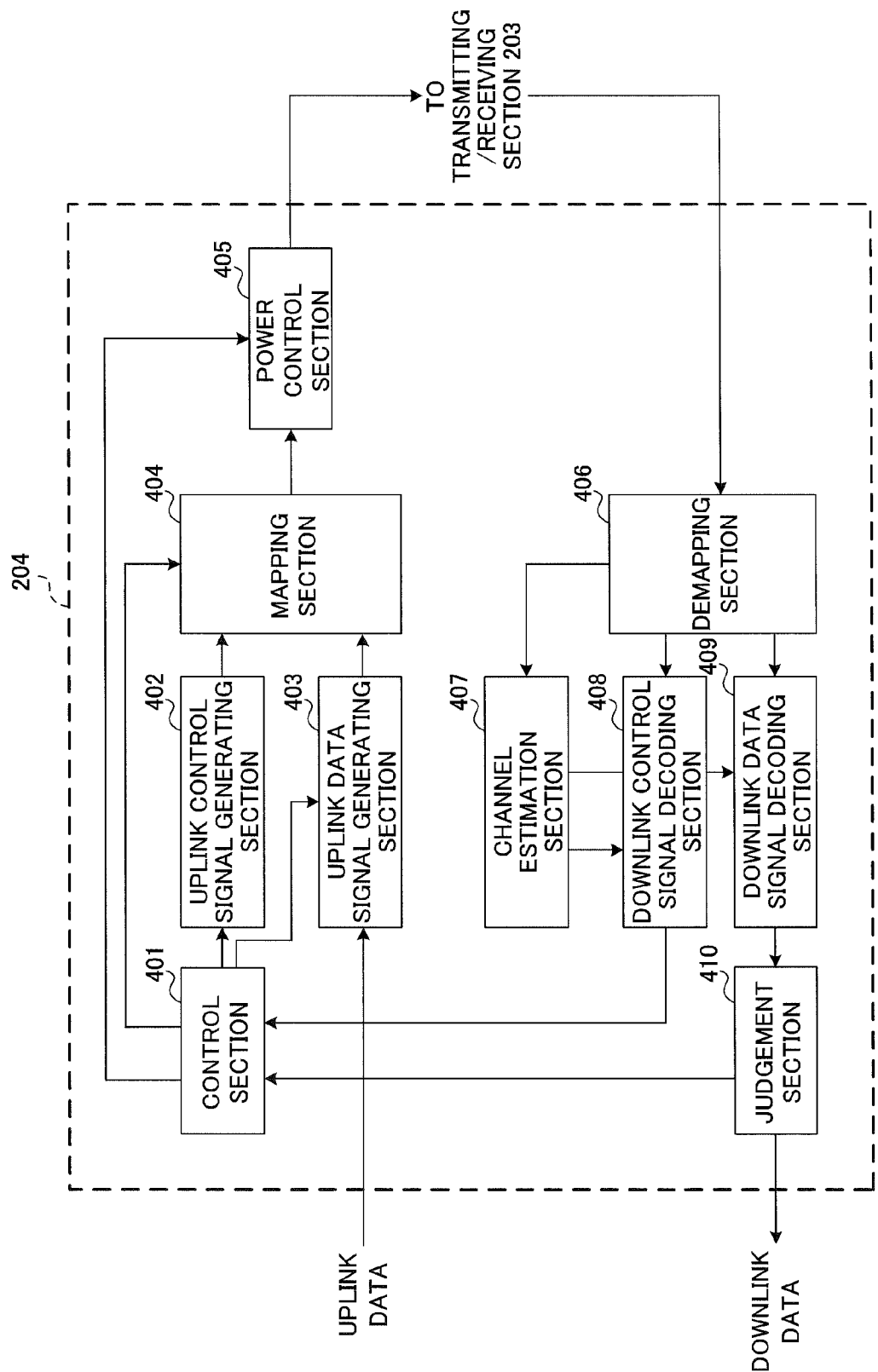
FIG. 11 is a diagram to explain a functional structure of a user terminal according to the present embodiment.

FIG. 11 is a diagram to show a principle functional structure of the baseband signal processing section 204 provided in a user terminal 20. As shown in FIG. 11, the baseband signal processing section 204 provided in the user terminal 20 is comprised at least of a control section 401, an uplink control signal generating section 402, an uplink data signal generating section 403, a mapping section 404 (assignment section), a power control section 405, a demapping section 406, a channel estimation section 407, a downlink control signal decoding section 408, a downlink data signal decoding section 409 and a judgement section 410.

The control section 401 controls the generation of uplink control signals (feedback signal) and uplink data signals, based on the downlink control signal (uplink grant, downlink assignment) and the retransmission control judgement result transmitted from the radio base station 10. The downlink control signal is output from the downlink control signal decoding section 408, and the retransmission control judgment result is output from the judgement section 410.

Also, based on the downlink control signal (uplink grant, downlink assignment) transmitted from the radio base station 10, the control section 401 commands the mapping section 404 as to the assignment of the uplink control signal (feedback signal) and the uplink data signal to radio resources.

Furthermore, based on the TPC command contained in the uplink grant or the downlink assignment transmitted from the radio base station 10 or the TPC command contained in the DCI format 3/3A, the control section 401 commands the power control section 405 as to power control. Note that, if the user terminal 20 receives a report from the radio base station 10 to the effect that the TPC command contained in the DCI format 3/3A is to be prioritized, the control section 401 configures a change in the order of priority of TPC commands.

In this case, if an uplink grant or a downlink assignment and a DCI format 3/3A are detected at the same time, the control section 401 commands the power control section 405 as to power control based on the TPC command contained in the DCI format 3/3A. On the other hand, if a DCI format 3/3A is not detected and an uplink grant or a downlink assignment is detected, the control section 401 commands the power control section 405 as to power control based on the TPC command contained in the uplink grant or the downlink assignment.

The uplink control signal generating section 402 generates uplink control signals (delivery acknowledgement signal, channel state information (CSI) and so on) based on commands from the control section 401. Also, the uplink data signal generating section 403 generates uplink data signals based on commands from the control section 401. Note that the control section 401 commands the uplink data signal 403 to generate an uplink data signal when an uplink grant is contained in a downlink control signal reported from the radio base station 10.

The mapping section 404 (assignment section) controls the assignment of the uplink control signals (feedback signal) and the uplink data signals to radio resources based on commands from the control section 401.

The power control section 405 configures the transmission power of the user terminal 20, and changes the transmission power of the PUSCH and the PUCCH based on commands from the control section 401.

The demapping section 406 demaps the downlink signals transmitted from the radio base station 10 and separates the downlink signals. The channel estimation section 407 estimates channel states from the reference signals included in the received signals separated in the demapping section 406, and outputs the estimated channel states to the downlink control signal decoding section 408 and the downlink data signal decoding section 409.

The downlink control signal decoding section 408 decodes the downlink control signal (uplink grant, downlink assignment) transmitted in the downlink control channel (PDCCH), and outputs the scheduling information (information regarding the assignment to uplink resources) to the control section 401. The downlink data signal decoding section 409 decodes the downlink data signal transmitted in the downlink shared channel (PDSCH), and outputs the result to the judgement section 410. The judgement section 410 makes a retransmission control judgement (ACK/NACK) based on the decoding result in the downlink data signal decoding section 409, and outputs the result to the control section 401.

Now, although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention defined by the recitations of the claims. For example, a plurality of examples described above may be combined and implemented as appropriate. Consequently, the descriptions herein are provided only for the purpose of explaining examples, and should by no means be construed to limit the present invention in any way.

The disclosure of Japanese Patent Application No. 2013-099629, filed on May 9, 2013, including the specification, drawings and abstract, is incorporated herein by reference in its entirety.

The invention claimed is:

1. A user terminal, comprising:
a receiver configured to receive physical downlink control channels respectively transmitted from different cells; and
a processor that, when an uplink grant or a downlink assignment and a control signal for power control are respectively detected from the physical downlink control channels, prioritizes a Transmit Power Control (TPC) command contained in the control signal for power control to change transmission power.

2. The user terminal according to claim 1, wherein the processor configures a change in the order of priority of the TPC command based on power control command information transmitted from the cell.

3. The user terminal according to claim 1, wherein the control signal for power control is a Downlink Control Information (DCI) format 3/3A.

4. The user terminal according to claim 3, wherein the control signal for power control is received via an enhanced Physical Downlink Control Channel (PDCCH).

5. The user terminal according to claim 1, wherein, when a plurality of control signals for power control are detected at the same time, the processor selects a TPC command to indicate a smallest value, and executes power control.

6. The user terminal according to claim 1, wherein, when a plurality of control signals for power control are detected at the same time, the processor selects a TPC command contained in a control signal for power control that is encoded with a lowest aggregation level, and executes power control.

7. The user terminal according to claim 1, wherein the processor prioritizes the TPC command contained in the control signal for power control when the value of a TPC command contained in the uplink grant or the downlink assignment is three.

8. A radio base station that communicates with a user terminal, comprising:
a processor configured to generate power control command information that, when a user terminal receives physical downlink control channels respectively transmitted from different cells and respectively detects an uplink grant or a downlink assignment and a control signal for power control from the physical downlink control channels, prioritizes a Transmit Power Control (TPC) command contained in the control signal for power control to change transmission power; and
a transmitter that transmits a downlink signal and the power control command information to the user terminal.

9. A radio communication method for a plurality of radio base stations and a user terminal, the radio communication method comprising:
in the user terminal,
receiving physical downlink control channels respectively transmitted from different cells; and
when an uplink grant or a downlink assignment and a control signal for power control are respectively detected from the physical downlink control channels, prioritizing a Transmit Power Control (TPC) command contained in the control signal for power control to change transmission power.

* * * * *